US012630680B2

(12) United States Patent
Ikeuchi et al.

(10) Patent No.: US 12,630,680 B2
(45) Date of Patent: May 19, 2026

(54) LINER FOR PRESSURE VESSEL AND HIGH-PRESSURE GAS STORAGE TANK

(71) Applicant: Mitsubishi Gas Chemical Company, Inc., Tokyo (JP)

(72) Inventors: Kousuke Ikeuchi, Hiratsuka (JP); Nobuhiko Matsumoto, Hiratsuka (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 577 days.

(21) Appl. No.: 18/019,420

(22) PCT Filed: Jun. 25, 2021

(86) PCT No.: PCT/JP2021/024133
§ 371 (c)(1),
(2) Date: Feb. 2, 2023

(87) PCT Pub. No.: WO2022/030135
PCT Pub. Date: Feb. 10, 2022

(65) Prior Publication Data

US 2023/0331943 A1 Oct. 19, 2023

(30) Foreign Application Priority Data

Aug. 4, 2020 (JP) ................................ 2020-132602

(51) Int. Cl.
*C08J 5/24* (2006.01)
*B29C 70/32* (2006.01)
(Continued)

(52) U.S. Cl.
CPC .............. *C08J 5/243* (2021.05); *C08G 59/44* (2013.01); *C08J 5/249* (2021.05); *B29C 70/32* (2013.01);
(Continued)

(58) Field of Classification Search
CPC ........ C08J 5/243; C08J 5/249; C08J 2363/00; C08G 59/44; B29C 70/32; B29K 2063/00;
(Continued)

(56) References Cited

U.S. PATENT DOCUMENTS

2005/0158494 A1 7/2005 Koyama et al.
2017/0343158 A1* 11/2017 Kato ......................... F17C 1/06
2018/0118877 A1 5/2018 Kouno et al.
2020/0071515 A1 3/2020 Kouno

FOREIGN PATENT DOCUMENTS

DE 102017207498 A1 * 11/2018 ............ B29C 70/86
DE 102017220882 A1 5/2019
(Continued)

OTHER PUBLICATIONS

Mizuno et al., JP 2008-304038 A machine translation in English, Dec. 18, 2008. (Year: 2008).*
Ahmet-Tsaous et al., DE 102017207498 A1 machine translation in English, Nov. 8, 2018. (Year: 2018).*

*Primary Examiner* — David T Karst
(74) *Attorney, Agent, or Firm* — Fitch, Even, Tabin & Flannery LLP

(57) ABSTRACT

Provided is a liner for a pressure vessel, the liner being constituted from a fiber-reinforced composite material containing a cured product of a thermosetting resin or a thermosetting resin composition, and continuous reinforcing fibers. Also provided is a high-pressure gas storage tank provided with the liner.

7 Claims, 5 Drawing Sheets

(51) Int. Cl.

| | |
|---|---|
| ***B29K 63/00*** | (2006.01) |
| ***B29K 307/04*** | (2006.01) |
| ***B29L 31/00*** | (2006.01) |
| ***C08G 59/44*** | (2006.01) |
| ***F16J 12/00*** | (2006.01) |

(52) U.S. Cl.
CPC ...... *B29K 2063/00* (2013.01); *B29K 2307/04* (2013.01); *B29L 2031/7156* (2013.01); *C08J 2363/00* (2013.01); *F16J 12/00* (2013.01)

(58) Field of Classification Search
CPC .......... B29K 2307/04; B29L 2031/7156; F16J 12/00
USPC .......................................................... 523/222
See application file for complete search history.

(56) References Cited

FOREIGN PATENT DOCUMENTS

| | | | |
|---|---|---|---|
| EP | 2842982 | A1 | 3/2015 |
| JP | H6-143439 | A | 5/1994 |
| JP | 2004-26225 | A | 1/2004 |
| JP | 2004-176898 | A | 6/2004 |
| JP | 2006-70125 | A | 3/2006 |
| JP | 2008-304038 | A | 12/2008 |
| JP | 2010-276146 | A | 12/2010 |
| WO | 2016/084475 | A1 | 6/2016 |
| WO | 2016/208344 | A1 | 12/2016 |
| WO | 2018/105282 | A1 | 6/2018 |

* cited by examiner

LINER FOR PRESSURE VESSEL AND HIGH-PRESSURE GAS STORAGE TANK

CROSS-REFERENCE TO RELATED APPLICATIONS

This application is a U.S. national phase application filed under 35 U.S.C. § 371 of International Application Number PCT/JP2021/024133 filed Jun. 25, 2021, designating the United States, which claims priority from Japanese Application Number 2020-132602, filed Aug. 4, 2020.

FIELD OF THE INVENTION

The present invention relates to a liner for a pressure vessel and a high-pressure gas storage tank provided with the liner.

BACKGROUND OF THE INVENTION

In recent years, use of environmentally-friendly natural gas vehicles (CNG vehicles) and fuel cell vehicles (FCV) has become more widespread. Fuel cell vehicles are powered by fuel cells in which hydrogen is used as fuel, and thus the establishment of hydrogen stations at which vehicles are filled with hydrogen that is compressed to a high pressure is essential.

Thus far, tanks made of steel have been used as high-pressure gas storage tanks that are used for hydrogen stations for fuel cell vehicles, or in other words, as vehicle-mounted fuel tanks for vehicles such as CNG vehicles and fuel cell vehicles. However, the development of lighter weight high-pressure gas storage tanks in which a resin material is used in the liner, or in the outer layer of the tank, is advancing. Reducing the weight of a vehicle-mounted fuel tank results in merits such as an improvement in the fuel economy of the vehicle in which the fuel tank is mounted.

Use of a resin having gas barrier properties and a fiber-reinforced composite material (FRP) in which reinforcing fibers are impregnated with the resin as a resin material constituting a high-pressure gas storage tank is known.

For example, Patent Document 1 discloses a resin liner containing a resin such as nylon as a main material having gas barrier properties and an elastomer containing an additive having hydrogen adsorption performance, and also discloses a high-pressure hydrogen tank having an FRP layer laminated on an outer peripheral surface thereof.

Patent Document 2 discloses a pressure vessel that includes a liner and an outer layer of the liner, with the outer layer being constituted of a composite material containing continuous fibers and a predetermined polyamide resin having gas barrier properties and infiltrated into the continuous fibers, and also discloses a liner constituted of the composite material.

CITATION LIST

Patent Document

Patent Document 1: JP 2010-276146 A

Patent Document 2: WO 2016/084475

SUMMARY OF INVENTION

A liner for a high-pressure gas storage tank requires strength, a barrier property with regard to a gas to be stored, and heat resistance of a level at which the liner can withstand temperature increases while the tank is in use.

A thermoplastic resin is used in both the resin liner disclosed in Patent Document 1 and the liner for a pressure vessel disclosed in Patent Document 2. However, a liner in which a thermoplastic resin is used is limited in that it is difficult to impart heat resistance exceeding the melting point or glass transition temperature of the resin that is used.

In addition, a liner in which a thermoplastic resin is used is thermoformed using a mold, but because it is necessary to transition through a series of molding cycles of heating and melting the resin, filling the mold with the resin, and cooling, further improvements in productivity are desired. With a thermoplastic resin having a low melting point or a low glass transition temperature, the cycles of heating and melting the resin and filling the mold with the resin can be implemented in a shorter period of time, but the thermal resistance of the obtained liner is reduced.

Thus, a problem to be addressed by the present invention is to provide a pressure vessel liner that is lightweight, has gas barrier properties, thermal resistance, and high strength, and enables excellent productivity, and to provide a high-pressure gas storage tank provided with the liner.

Solution to Problem

The present inventors discovered that a pressure vessel liner constituted from a fiber-reinforced composite material including a cured product of a thermosetting resin or a thermosetting resin composition and continuous reinforcing fibers can solve the above problem.

That is, the present invention relates to the following aspects [1] to [3]:

[1] A liner for a pressure vessel, the liner being constituted from a fiber-reinforced composite material, the fiber-reinforced composite material including a cured product of a thermosetting resin or a thermosetting resin composition, and continuous reinforcing fibers.

[2] A method for manufacturing the liner for a pressure vessel described [1] above, the method including molding a tow prepreg constituted from: the thermosetting resin or thermosetting resin composition; and a continuous reinforcing fiber bundle, the molding performed by a braiding method or a winding method.

[3] A high-pressure gas storage tank provided with the liner for a pressure vessel described in [1] above.

According to the present invention, a pressure vessel liner that is lightweight, has gas barrier properties such as a hydrogen gas barrier property, and also thermal resistance and high strength, and enables excellent productivity can be provided.

The gas barrier properties, heat resistance, and strength of the pressure vessel liner according to the present invention are high, and therefore the resulting pressure vessel can be used as is as a pressure vessel for a high-pressure gas storage tank without providing an outer layer. A high-pressure gas storage tank provided with the pressure vessel liner is suitable as a vehicle-mounted high-pressure gas storage tank, and because the high-pressure gas storage tank is lightweight, the tank can improve the fuel economy of the vehicle on which it is mounted.

DESCRIPTION OF EMBODIMENTS

Pressure Vessel Liner

The pressure vessel liner according to the present invention (hereinafter, also referred to simply as "the liner of the present invention") is constituted from a fiber-reinforced composite material containing a cured product of a thermosetting resin or a thermosetting resin composition and continuous reinforcing fibers.

As used herein, the term "pressure vessel liner" means a member that constitutes the inner surface of a pressure vessel, or in other words, a member that is in direct contact with the contents of the pressure vessel. Thus, a pressure vessel made only of the pressure vessel liner of the present invention is also encompassed by the term "liner" as defined in the present invention.

The liner of the present invention is constituted from a fiber-reinforced composite material containing a cured product of a thermosetting resin or a thermosetting resin composition and continuous reinforcing fibers, and thereby the liner is lightweight, exhibits barrier properties to gases such as oxygen, thermal resistance, and high strength, and excels in productivity.

The reason for this is as follows: With a known pressure vessel liner containing a thermoplastic resin as a matrix resin and continuous reinforcing fibers, the thermoplastic resin inevitably has a melting point or a glass transition temperature (Tg), and therefore is limited with regard to imparting heat resistance. In contrast, the liner of the present invention, which contains a cured product of a thermosetting resin or a thermosetting resin composition as a matrix resin, can achieve higher heat resistance because the cured product either does not have a Tg, or even if the cured product has a Tg, the Tg is higher than that of a thermoplastic resin.

Furthermore, molding a liner that includes a thermoplastic resin and continuous reinforcing fibers requires a cycle of heating the material to a temperature exceeding the melting point or Tg of the thermoplastic resin, then molding the material, and next cooling the molded material, and therefore the molding time tends to be long. In addition, a mandrel, a mold, or the like is essential for molding the material into the desired liner shape. In contrast, with the liner of the present invention, which uses a thermosetting resin or a thermosetting resin composition and a continuous reinforcing fibers, if a technique such as a below-described braiding method is used, a method can be adopted in which the continuous reinforcing fibers are impregnated with the thermosetting resin or thermosetting resin composition, and then continuously molded without using a mandrel, a mold, or the like. Therefore, the liner of the present invention also excels in productivity.

The liner of the present invention may be provided internally with a space to be filled with a gas, and is usually a hollow shape. The shape of the liner of the present invention is described with reference to the drawings.

Figure 1:
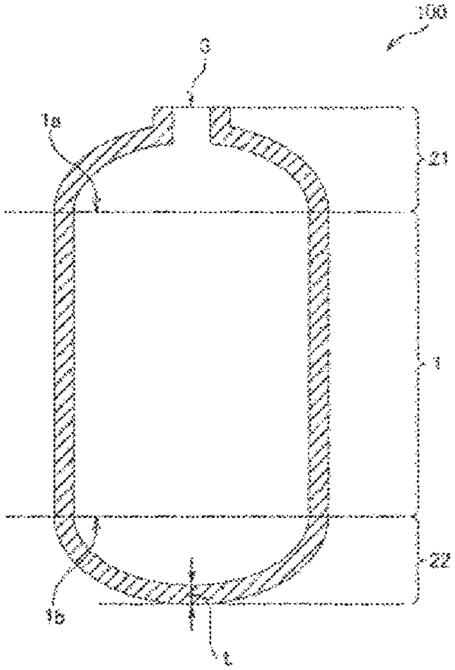
FIG. 1 is a cross-sectional schematic view illustrating an embodiment of a pressure vessel liner of the present invention.
Figure 2:
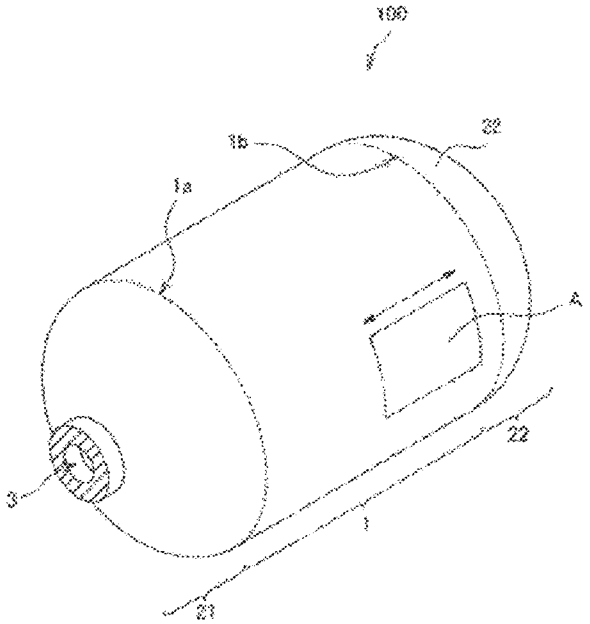
FIG. 2 is a perspective view illustrating an embodiment of the pressure vessel liner of the present invention.

FIG. 1 is a cross-sectional schematic view illustrating an embodiment of a pressure vessel liner of the present invention, and FIG. 2 is a perspective view of the same. In FIGS. 1 and 2, a liner 100 includes a cylindrical portion 1 and two dome portions 21, 22 that seal both ends (1*a* and 1*b*) of the cylindrical portion 1.

Each of the dome portions 21, 22 is hollow, and at least one of the dome portions (the dome portion 21 in FIG. 1) is preferably provided with, at a top part of the dome portion, an opening 3 for joining a valve or the like for a pressure vessel.

In addition, for example, if the liner is one that is used in a pressure vessel provided with another member such as an outer layer, the liner 100 may be provided with an attachment/detachment part (not illustrated) for attaching and detaching with the other member.

The liner 100 of the present invention is constituted from a fiber-reinforced composite material 10 containing a cured product of a thermosetting resin or thermosetting resin composition and continuous reinforcing fibers.

From the viewpoints of gas barrier properties, strength, impact resistance, and productivity, the fiber-reinforced composite material 10 constituting the liner 100 is preferably formed using a tow prepreg constituted from a thermosetting resin or a thermosetting resin composition and a continuous reinforcing fiber bundle. A liner 100 constituted from the fiber-reinforced composite material 10 having a helical structure, a braided structure, a spiral structure, or the like can be obtained by using the tow prepreg and molding through a method such as the braiding method or the winding method.

Figure 3:
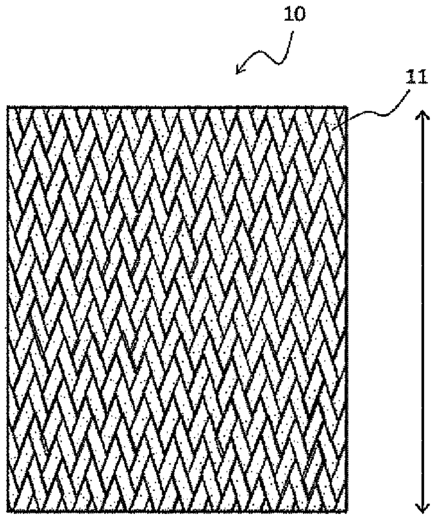
FIG. 3 is a schematic plan view (partially enlarged view) illustrating an embodiment of a fiber-reinforced composite material constituting a pressure vessel liner according of the present invention.
Figure 4:
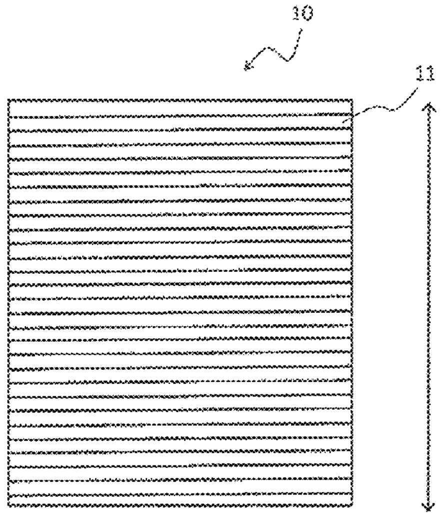
FIG. 4 is a schematic plan view (partially enlarged view) illustrating an embodiment of a fiber-reinforced composite material constituting a pressure vessel liner of the present invention.

From the viewpoint of improving gas barrier properties, strength, impact resistance, and the like, the fiber-reinforced composite material 10 constituting the liner 100 preferably has a braided structure (FIG. 3) or a spiral structure (FIG. 4).

FIGS. 3 and 4 are schematic plan views (partially enlarged views) illustrating an embodiment of the fiber-reinforced composite material 10 constituting the liner 100, and illustrate an area A cut out from a side surface of the liner 100 illustrated in FIG. 2. As illustrated in FIGS. 3 and 4, the braided structure and the spiral structure are structures in which a cured product 11 of the tow prepreg constituted from a thermosetting resin or a thermosetting resin composition and a continuous reinforcing fiber bundle are arranged in a braided shape or a spiral shape without gaps, and the hollow-shaped structure of the linter 100 is thereby formed.

From the viewpoint of gas barrier properties, strength, impact resistance, and productivity, at least the cylindrical portion 1 constituting the liner 100 preferably has a braided structure or a spiral structure. The dome portions 21, 22 constituting the liner 100 may also be constituted from a fiber-reinforced composite material 10 having a braided structure or a spiral structure, but are not particularly limited.

For example, a liner having a braided structure can be manufactured by molding with a braiding method using a tow prepreg constituted from a thermosetting resin or a thermosetting resin composition and a continuous reinforcing fiber bundle. In addition, a liner having a spiral structure can be manufactured using the tow prepreg by molding through the winding method or implementing unidirectional braiding. Liners with a braided structure or a spiral structure exhibit excellent gas barrier properties, strength, and impact resistance, and are also advantageous in terms of productivity.

The liner 100 in FIGS. 1 and 2 may be molded by individually producing the cylindrical portion and the dome portions and then joining the components thereof, or the cylindrical portion and the dome portions may be integrally molded. From the viewpoint of the productivity of the liner, integrally molding the cylindrical portion 1 and at least one of the dome portions is preferable.

If the braiding method or the winding method is used, the cylindrical portion and the dome portions of the liner can be easily integrally molded using a tow prepreg.

In a case in which the dome portion of the liner is separately produced, the production method is not particularly limited, and for example, a prepreg obtained by impregnating the reinforcing fibers in advance with a thermosetting resin or a thermosetting resin composition can be hot press molded using a mold. When the thermosetting resin and the thermosetting resin composition that are used are solvent-free, the dome portion can be produced through a known molding method such as vacuum assisted resin transfer molding (Va-RTM), resin transfer molding (RTM), and high pressure resin transfer molding (HP-RTM).

At this time, the thermosetting resin or thermosetting resin composition and the reinforcing fibers constituting the dome portion are the same materials as the materials constituting the cylindrical portion of the liner.

Alternatively, when the dome portion of the liner is separately produced, the dome portion can be produced using a thermoplastic resin or a thermoplastic resin composition. The dome portion may be produced using a prepreg in which reinforcing fibers are impregnated with or laminated to a thermoplastic resin or a thermoplastic resin composition. Examples of the thermoplastic resin include a polyamide resin, a polyester resin, a polyolefin resin, a polyimide resin, a polycarbonate resin, a polyether imide resin, a polyamide imide resin, a polyphenylene ether imide resin, a polyphenylene sulfide resin, a polysulfone resin, a polyester sulfone resin, a polyarylate resin, a liquid crystal polymer, a polyether ether ketone resin, a polyether ketone resin, a polyether ketone ketone resin, a polyether ether ketone ketone resin, and a polybenzimidazole resin, and of these, a single type may be used, or two or more types may be combined and used.

The thickness (t in FIG. 1) of the liner 100 can be appropriately selected according to details such as the volume and shape of the pressure vessel, and the thickness of the continuous reinforcing fibers or outer diameter of the fiber bundles to be used. From the viewpoint of ensuring sufficient pressure resistance and barrier properties to gases such as hydrogen gas when the liner is used in a pressure vessel, the thickness of the liner is 100 μm or more, more preferably 200 μm or more, and even more preferably 400 μm or more, and from the viewpoint of reducing the size and weight of the liner and pressure vessel, the thickness of the liner is preferably 60 mm or less, and more preferably 40 mm or less.

Thermosetting Resin and Thermosetting Resin Composition

The thermosetting resin used in the liner of the present invention is not particularly limited as long as it is a resin that can be cured through heating. Also, the thermosetting resin composition used in the present invention is a composition containing the thermosetting resin.

The thermosetting resin is at least one selected from the group consisting of, for example, epoxy resins, phenolic resins, urea resins, melamine resins, unsaturated polyimide resins, silicon resins, urethane resins, casein resins, furan resins, alkyd resins, and xylene resins. Among these, from the viewpoint of ease of impregnation into the continuous reinforcing fibers, and from the viewpoint of the heat resistance, strength, and barrier properties to gases such as hydrogen gas of the obtained cured product, epoxy resin is preferable.

Examples of the epoxy resin composition containing an epoxy resin as the thermosetting resin include a two-part curable epoxy resin composition containing an epoxy resin (epoxy group-containing compound) as the main agent, and an epoxy resin curing agent.

From the viewpoint of obtaining higher gas barrier properties and impact resistance, the thermosetting resin composition is preferably an epoxy resin composition, and the epoxy resin composition is preferably an epoxy resin composition including an epoxy resin (A) and an epoxy resin curing agent (B) containing a reaction product (X) from a reaction between a component (x1 and a component (x2) described below.

(x1) At least one selected from the group consisting of meta-xylylenediamine and para-xylylenediamine.

(x2) At least one selected from the group consisting of unsaturated carboxylic acids represented by General Formula (1) below and derivatives thereof.

(1)

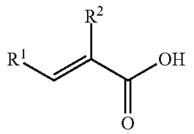

(In Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.)

The epoxy resin composition preferably further contains a solvent from the viewpoint of increasing the ability to be impregnated into the reinforcing fibers.

Details of the epoxy resin composition, which is a preferred aspect of the thermosetting resin composition used in the present invention, are described below.

Epoxy Resin (A)

The epoxy resin (A) (hereinafter, also referred to simply as a "component (A)") is not particularly limited as long as it is a polyfunctional epoxy resin having two or more epoxy groups, but a polyfunctional epoxy resin containing an aromatic ring or an alicyclic structure in the molecule is preferred when consideration is given to the expression of high gas barrier properties.

Specific examples of the polyfunctional epoxy resin include at least one resin selected from epoxy resins having a glycidylamino group derived from meta-xylylenediamine, epoxy resins having a glycidylamino group derived from para-xylylenediamine, epoxy resins having a glycidylamino group derived from 1,3-bis(aminomethyl) cyclohexane, epoxy resins having a glycidylamino group derived from 1,4-bis(aminomethyl) cyclohexane, epoxy resins having a glycidylamino group derived from diaminodiphenylmethane, epoxy resins having a glycidylamino group and/or a glycidyloxy group derived from a para-aminophenol, epoxy resins having a glycidyloxy group derived from bisphenol A, epoxy resins having a glycidyloxy group derived from bisphenol F, epoxy resins having a glycidyloxy group derived from a phenol novolac, and epoxy resins having a glycidyloxy group derived from resorcinol. In order to improve various performance aspects such as flexibility, impact resistance, and moist heat resistance, two or more types of the epoxy resins described above may be mixed at appropriate ratios and used.

Of the abovementioned polyfunctional epoxy resins, from the viewpoint of gas barrier properties, the epoxy resin (A) is preferably one having, as a main component, at least one component selected from the group consisting of an epoxy resin having a glycidylamino group derived from meta-xylylenediamine, an epoxy resin having a glycidylamino group derived from para-xylylenediamine, and an epoxy resin having a glycidyloxy group derived from bisphenol F, and is more preferably one having, as a main component, an epoxy resin having a glycidylamino group derived from meta-xylylenediamine.

Note that "main component" here means that other components may be included within a range that does not depart from the spirit of the present invention, and also means a component that is included in an amount of preferably from 50 to 100 mass %, more preferably from 70 to 100 mass %, and even more preferably from 90 to 100 mass % relative to the total amount.

Epoxy Resin Curing Agent (B)

From the viewpoint of expressing both high gas barrier properties and impact resistance, the epoxy resin curing agent (B) (hereinafter, also referred to simply as a "component (B)") contains an epoxy resin curing agent (B) containing a reaction product (X) of a component (x1) and a component (x2) described below.

(x1) At least one selected from the group consisting of meta-xylylenediamine and para-xylylenediamine.

(x2) At least one selected from the group consisting of unsaturated carboxylic acids represented by General Formula (1) below and derivatives thereof (1)

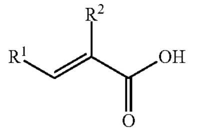

(In Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.)

Reaction Product (X)

The reaction product (X) is a reaction product of the component (x1) and the component (x2).

The component (x1) is used from the viewpoint of gas barrier properties and is preferably meta-xylylenediamine in terms of gas barrier properties. One type of the component (x1) may be used alone, or two types of the components (x1) may be mixed and used.

The component (x2) is at least one selected from the group consisting of unsaturated carboxylic acids represented by General Formula (1) above and derivatives thereof. Moreover, from the viewpoint of expressing high gas barrier properties and impact resistance, $R^1$ in General Formula (1) above is preferably a hydrogen atom or an alkyl group having from 1 to 8 carbons, more preferably a hydrogen atom or an alkyl group having from 1 to 3 carbons, even more preferably a hydrogen atom or a methyl group, and yet even more preferably a hydrogen atom.

Moreover, from the viewpoint of expressing high gas barrier properties and impact resistance, $R^2$ in General Formula (1) is preferably a hydrogen atom or an alkyl group having from 1 to 8 carbons, more preferably a hydrogen atom or an alkyl group having from 1 to 3 carbons, even more preferably a hydrogen atom or a methyl group, and yet even more preferably a hydrogen atom.

Examples of the derivatives of the unsaturated carboxylic acids represented by General Formula (1) include esters, amides, acid anhydrides, and acid chlorides of the unsaturated carboxylic acids. The ester of the unsaturated carboxylic acid is preferably an alkyl ester, and in terms of obtaining good reactivity, the alkyl has preferably from 1 to 6 carbons, more preferably from 1 to 3 carbons, and even more preferably from 1 to 2 carbons.

Examples of the unsaturated carboxylic acids represented by General Formula (1) above and the derivatives thereof include unsaturated carboxylic acids, such as acrylic acid, methacrylic acid, α-ethylacrylic acid, α-propylacrylic acid, α-isopropylacrylic acid, α-n-butylacrylic acid, α-t-butylacrylic acid, α-pentylacrylic acid, α-phenylacrylic acid, α-benzylacrylic acid, crotonic acid, 2-pentenoic acid, 2-hexenoic acid, 4-methyl-2-pentenoic acid, 2-heptenoic acid, 4-methyl-2-hexenoic acid, 5-methyl-2-hexenoic acid, 4,4-dimethyl-2-pentenoic acid, 4-phenyl-2-butenoic acid, cinnamic acid, o-methyl cinnamic acid, m-methyl cinnamic acid, p-methyl cinnamic acid, and 2-octenoic acid; and esters, amides, acid anhydrides, and acid chlorides of these unsaturated carboxylic acids.

Among the above, from the viewpoint of expressing high gas barrier properties and impact resistance, the component (x2) is preferably at least one selected from the group consisting of acrylic acid, methacrylic acid, crotonic acid, and derivatives of these acids, more preferably at least one selected from the group consisting of acrylic acid, methacrylic acid, crotonic acid, and alkyl esters of these acids, even more preferably at least one selected from the group consisting of acrylic acid, methacrylic acid, and alkyl esters of these acids, still more preferably an alkyl ester of acrylic acid, and still even more preferably methyl acrylate.

One type of the component (x2) may be used alone, or two or more types may be combined and used.

When an unsaturated carboxylic acid, an ester, or an amide is used as the component (x2), the reaction between the component (x1) and the component (x2) is carried out by mixing the component (x1) and the component (x2) under conditions including a temperature of from 0 to 100° C. and more preferably 0 to 70° C., and carrying out a Michael addition reaction and an amide group formation reaction by dehydration, dealcoholization, and deamination under conditions including a temperature of from 100 to 300° C. and preferably from 130 to 250° C.

In this case, in the amide group formation reaction, to complete the reaction, the pressure inside a reaction device can be reduced at the final stage of the reaction as necessary. In addition, a non-reactive solvent can be used to dilute as necessary. Furthermore, a catalyst, such as a phosphite ester, can be added as a dehydrating agent or a dealcoholizing agent.

On the other hand, when an acid anhydride or an acid chloride of an unsaturated carboxylic acid is used as the component (x2), the reaction is carried out by mixing under conditions including a temperature of from 0 to 150° C. and preferably from 0 to 100° C., and then carrying out a Michael addition reaction and an amide group formation reaction. In this case, in the amide group formation reaction, to complete the reaction, the pressure inside a reaction device can be reduced at the final stage of the reaction as necessary. In addition, a non-reactive solvent can be used to dilute as necessary. Furthermore, a tertiary amine, such as pyridine, picoline, lutidine, or trialkylamine, can be added.

The amide group moiety formed by the reaction between the component (x1) and the component (x2) has high cohesive force, and thus the cured product of the epoxy resin composition, in which the epoxy resin curing agent (B) containing the reaction product (X) of the component (x1) and the component (x2) is used, exhibits high gas barrier properties and good adhesiveness with the reinforcing fibers.

In the reaction product (X), a reaction molar ratio [(x2)/(x1)] of the component (x2) to the component (x1) is preferably in a range from 0.3 to 1.0, and more preferably in a range from 0.6 to 1.0. When the reaction molar ratio is 0.3 or more, a sufficient amount of the amide groups is produced in the epoxy resin curing agent, and the gas barrier properties and adhesiveness to the reinforcing fibers are exhibited at high levels. On the other hand, when the reaction molar ratio is in a range of 1.0 or less, the amount of amino groups necessary for reaction with the epoxy groups in the epoxy resin (A) is sufficient, and excellent thermal resistance and excellent solubility in an organic solvent are exhibited.

The reaction product (X) may be a reaction product of the components (x1) and (x2), and at least one compound selected from the group consisting of the following components (x3), (x4) and (x5).

(x3) At least one component selected from the group consisting of monovalent carboxylic acids represented by $R^3$—COOH and derivatives thereof (where $R^3$ represents a hydrogen atom, an alkyl group having from 1 to 7 carbons and which may have a hydroxyl group, or an aryl group having from 6 to 12 carbons)

(x4) A cyclic carbonate (x5) A mono-epoxy compound having from 2 to 20 carbons

The component (x3) is a monovalent carboxylic acid represented by $R^3$—COOH or a derivative thereof and is used as necessary from the viewpoints of reducing reactivity between the epoxy resin (A) and the epoxy resin curing agent (B) containing the reaction product (X), and improving workability, pot life, and the like.

$R^3$ represents a hydrogen atom, an alkyl group having from 1 to 7 carbons and which may have a hydroxyl group, or an aryl group having from 6 to 12 carbons, and $R^3$ is preferably an alkyl group having from 1 to 3 carbons or a phenyl group.

Examples of derivatives of the monovalent carboxylic acid represented by $R^3$—COOH include esters, amides, acid anhydrides, and acid chlorides of the carboxylic acid. The ester of the carboxylic acid is preferably an alkyl ester, and the number of carbons of the alkyl is preferably from 1 to 6, more preferably from 1 to 3, and even more preferably 1 or 2.

Examples of the component (x3) include monovalent carboxylic acids such as formic acid, acetic acid, propionic acid, butyric acid, lactic acid, glycolic acid, and benzoic acid, and derivatives thereof.

One type of the component (x3) may be used alone, or two or more types may be combined and used.

The component (x4), which is a cyclic carbonate, is used as necessary from the viewpoints of reducing reactivity between the epoxy resin (A) and the epoxy resin curing agent (B) containing the reaction product (X), and improving workability, pot life, and the like.

From the viewpoint of reactivity with the component (x1), the component (x4) is preferably a cyclic carbonate that is a ring of six or fewer members. Examples include ethylene carbonate, propylene carbonate, glycerin carbonate, 1,2-butylene carbonate, vinylene carbonate, 4-vinyl-1,3-dioxolan-2-one, 4-methoxymethyl-1,3-dioxolan-2-one, and 1,3-dioxan-2-one. Among these, from the viewpoint of gas barrier properties, at least one selected from the group consisting of ethylene carbonate, propylene carbonate, and glycerin carbonate is preferable.

One type of the component (x4) may be used alone, or two or more types may be combined and used.

The mono-epoxy compound, which is the component (x5), is a mono-epoxy compound having from 2 to 20 carbons and is used as necessary, from the viewpoints of reducing reactivity between the epoxy resin (A) and the epoxy resin curing agent (B) containing the reaction product (X), and improving workability, pot life, and the like. From the viewpoint of gas barrier properties, the component (x5) is preferably a mono-epoxy compound having from 2 to 10 carbons and is more preferably a compound represented by the following Formula (2).

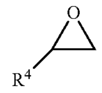

(2)

(In Formula (2), $R^4$ represents a hydrogen atom, an alkyl group having from 1 to 8 carbons, an aryl group, a chloromethyl group, or $R^5$—O—$CH_2$—, and $R^5$ represents a phenyl group or a benzyl group.)

Examples of the mono-epoxy compound represented by Formula (2) include ethylene oxide, propylene oxide, 1,2-butylene oxide, styrene oxide, epichlorohydrin, phenylglycidyl ether, and benzylglycidyl ether.

One type of the component (x5) may be used alone, or two or more types may be combined and used.

For a case where the component (x3), (x4), or (x5) is used in the reaction product (X), any one type of compound selected from the group consisting of the components (x3), (x4), and (x5) may be used alone, or a combination of two or more types may be used.

Note that the reaction product (X) may be a reaction product that is obtained by reacting, in addition to the components (x1) to (x5), another component within a scope that does not hinder the effect of the present invention. Examples of the other component referred to here include aromatic dicarboxylic acids or derivatives thereof.

However, the usage amount of the "other component" is preferably 30 mass % or less, more preferably 10 mass % or less, and even more preferably 5 mass % or less of the total amount of the reaction components constituting the reaction product (X).

The reaction product of the components (x1) and (x2) and the at least one compound selected from the group consisting of the components (x3), (x4), and (x5) is obtained by using at least one compound selected from the group consisting of the components (x3), (x4), and (x5) in combination with the component (x2) and reacting this combination with the component (x1), which is a polyamine compound. The reaction may be carried out by adding the components (x2) to (x5) in any order and reacting these components with the component (x1), or by mixing the components (x2) to (x5) and then reacting the mixture with the component (x1).

The reaction between the component (x1) and the component (x3) can be carried out under the same conditions as those of the reaction between the component (x1) and the component (x2). When the component (x3) is used, the component (x2) and the component (x3) may be mixed and then reacted with the component (x1), or the component (x1) and component (x2) may be first reacted and then reacted with the component (x3).

On the other hand, in a case where the component (x4) and/or the component (x5) is used, preferably, the components (x1) and (x2) are first reacted, and then further reacted with the component (x4) and/or the component (x5).

The reaction between the component (x1) and the component (x4) and/or the component (x5) is carried out by mixing the component (x1) and the component (x4) and/or the component (x5) at a temperature of from 25 to 200° C., and then carrying out an addition reaction at a temperature of from 30 to 180° C. and preferably from 40 to 170° C. Furthermore, as necessary, a catalyst such as sodium methoxide, sodium ethoxide, and potassium t-butoxide can be used.

When the reaction is to be carried out, as necessary, the component (x4) and/or the component (x5) may be melted or diluted with a non-reactive solvent and used in order to facilitate the reaction.

Even for a case where the reaction product (X) is a reaction product of the components (x1) and (x2) and at least one compound selected from the group consisting of the components (x3), (x4), and (x5), the reaction molar ratio [(x2)/(x1)] of the component (x2) to the component (x1) is, for the same reason as described above, preferably in a range from 0.3 to 1.0, and more preferably in a range from 0.6 to 1.0. Meanwhile, the reaction molar ratio [{(x3)+(x4)+(x5)}/(x1)] of the components (x3), (x4), and (x5) to the component (x1) is preferably in a range from 0.05 to 3.1, more preferably in a range from 0.07 to 2.5, and even more preferably in a range from 0.1 to 2.0.

However, from viewpoints such as the gas barrier properties, workability, and pot life, the reaction molar ratio [{(x2)+(x3)+(x4)+(x5)}/(x1)] of the components (x2) to (x5) to the component (x1) is preferably in a range from 0.35 to 2.5 and more preferably in a range from 0.35 to 2.0.

The epoxy resin curing agent (B) may contain a curing agent component other than the reaction product (X). The "curing agent component other than the reaction product (X)" is a component other than the reaction product (X), the component having two or more functional groups that can react with the epoxy group in the epoxy resin (A), and from the viewpoints of reactivity with the epoxy resin (A) and the gas barrier properties, examples of preferable components thereof include, other than the component (x1), polyamine compounds having two or more amino groups per molecule, and modified products of the polyamine compounds.

However, from the viewpoint of expressing high gas barrier properties and impact resistance, the content of the reaction product (X) in the epoxy resin curing agent (B) is preferably high. From the abovementioned viewpoint, the content of the reaction product (X) in the epoxy resin curing agent (B) is preferably 50 mass % or higher, more preferably 70 mass % or higher, even more preferably 80 mass % or higher, and yet even more preferably 90 mass % or higher. Furthermore, the upper limit is 100 mass %.

The compounding ratio of the epoxy resin (A) and the epoxy resin curing agent (B) in the epoxy resin composition may be within the standard compounding range that is ordinarily used for a case in which a cured product is produced through a reaction between an epoxy resin and an epoxy resin curing agent. Specifically, a ratio (number of active amine hydrogens in the epoxy resin curing agent (B))/(number of epoxy groups in the epoxy resin (A)) of the number of active amine hydrogens in the epoxy resin curing agent (B) to the number of epoxy groups in the epoxy resin (A) is preferably in a range from 0.2 to 12.0. From the viewpoint of expressing high gas barrier properties and impact resistance, the ratio of the (number of active amine hydrogens in the epoxy resin curing agent (B))/(number of epoxy groups in the epoxy resin (A)) is more preferably in a range from 0.4 to 10.0, even more preferably from 0.6 to 8.0, yet even more preferably from 0.9 to 6.0, and still more preferably from greater than 1.0 to 5.0 or less.

From the viewpoint of further improving impact resistance, the ratio of the (number of active amine hydrogens in the epoxy resin curing agent (B))/(number of epoxy groups in the epoxy resin (A)) is more preferably 1.1 or more, even more preferably 1.4 or more, and yet even more preferably 2.0 or more, and from the viewpoint of further improving the hydrogen gas barrier property, the ratio thereof is more preferably 4.0 or less, and even more preferably 3.2 or less.

Solvent

The epoxy resin composition preferably further contains a solvent from the viewpoint of reducing the viscosity of the composition and increasing the property of impregnation into the continuous reinforcing fibers.

As the solvent, a non-reactive solvent is preferable, and specific examples thereof include alcohol-based solvents, such as methanol, ethanol, 1-propanol, 2-propanol, 1-butanol, 2-butanol, 2-methoxyethanol, 2-ethoxyethanol, 2-propoxyethanol, 2-butoxyethanol, 1-methoxy-2-propanol, 1-ethoxy-2-propanol, and 1-propoxy-2-propanol; ester-based solvents, such as ethyl acetate and butyl acetate; ketone-based solvents, such as acetone and methyl isobutyl ketone; ether-based solvents, such as diethyl ether and diisopropyl ether; and hydrocarbon-based solvents, such as toluene, and of these, a single type may be used, or two or more types may be used.

From the viewpoint of the solubility of the epoxy resin (A) and the epoxy resin curing agent (B) and the viewpoint of the ease of removing the solvent, the solvent is preferably at least one selected from the group consisting of alcohol-based solvents, ester-based solvents, and hydrocarbon-based solvents, having 8 or less carbons, is more preferably at least one selected from the group consisting of methanol, ethanol, 1-propanol, 2-propanol, 1-butanol, 2-butanol, ethyl acetate, and toluene, and is even more preferably at least one selected from the group consisting of methanol and ethyl acetate.

When the epoxy resin composition contains a solvent, the content of the solvent is not particularly limited, but from the viewpoint of increasing the property of impregnation of the epoxy resin composition into the continuous reinforcing fibers, the content of the solvent is preferably 5 mass % or more, more preferably 10 mass % or more, even more preferably 15 mass % or more, yet even more preferably 20 mass % or more, still even more preferably 30 mass % or more, and even more preferably 40 mass % or more, and from the viewpoint of ease of removing the solvent, the content of the solvent is preferably 95 mass % or less, more preferably 90 mass % or less, even more preferably 80 mass % or less, and yet even more preferably 70 mass % or less.

The epoxy resin composition may contain, as necessary and within a range that does not impair the effects of the present invention, additives such as a thermosetting resin other than the epoxy resin (A), a coupling agent, a reactive diluent, a non-reactive diluent other than the solvent, a curing accelerator, a wetting agent, a tackifier, an antifoaming agent, a rust-proofing agent, a lubricant, a pigment, an oxygen scavenger, a UV absorber, and an antioxidant.

When the epoxy resin composition contains an additive described above, the total content of these additives in the composition is preferably 20.0 parts by mass or less, and more preferably from 0.001 to 15.0 parts by mass, per 100 parts by mass of the total amount of the epoxy resin (A) and the epoxy resin curing agent (B).

In terms of obtaining the effects of the present invention, the total content of the epoxy resin (A) and the epoxy resin curing agent (B) in the solid content of the epoxy resin composition is preferably 60 mass % or more, more preferably 70 mass % or more, even more preferably 80 mass % or more, and yet even more preferably 85 mass % or more, and the upper limit is 100 mass %. The "solid content of the epoxy resin composition" means components excluding the water and solvent in the epoxy resin composition.

The epoxy resin composition can be prepared, for example, by blending a predetermined amount of each of the epoxy resin (A), the epoxy resin curing agent (B), the solvent, and additives that are used as necessary, and then stirring and mixing using a well-known method and apparatus.

Continuous Reinforcing Fibers

The continuous reinforcing fibers used in the liner of the present invention are reinforcing fibers having a fiber length of greater than 100 mm.

Examples of the shape of the continuous reinforcing fibers include tow, sheet, and tape shapes, and the continuous reinforcing fibers constituting a sheet or tape include, for example, unidirectional (UD) materials, textiles, and nonwoven fabrics.

From the viewpoint of molding the liner of the present invention by the below-described braiding method, winding method, or the like, the shape of the continuous reinforcing fibers is preferably a tow or tape shape, and the tow (continuous reinforcing fiber bundle) is more preferable. From the viewpoint of easily obtaining a high strength and a high elastic modulus, the number of fiber bundles (number of filaments) constituting the tow is preferably from 3K to 50K, and more preferably from 6K to 40K.

The average fiber length of the continuous reinforcing fiber bundle is not particularly limited, but from the viewpoint of molding processability, the average fiber length is preferably from 1 to 10000 m, and more preferably from 100 to 10000 m.

From the viewpoint of molding processability and the viewpoint of easily obtaining a high strength and a high elastic modulus, the average fineness of the continuous reinforcing fiber bundle is preferably from 50 to 2000 tex (g/1000 m), more preferably from 200 to 1500 tex, and even more preferably from 500 to 1500 tex.

Also, the average tensile modulus of the continuous reinforcing fiber bundle is preferably from 50 to 1000 GPa.

Examples of types of the continuous reinforcing fibers include inorganic fibers, such as glass fibers, carbon fibers, metal fibers, boron fibers, basalt fibers, and ceramic fibers; and organic fibers, such as aramid fibers, polyoxymethylene fibers, aromatic polyamide fibers, polyparaphenylene benzobisoxazole fibers, and ultra-high molecular weight polyethylene fibers. Among these, inorganic fibers are preferable as the continuous reinforcing fibers from the viewpoint of obtaining a high strength, and at least one of inorganic fibers selected from the group consisting of glass fibers, carbon fibers, and basalt fibers is more preferable because of the fibers being lightweight with high strength and a high elastic modulus, and carbon fibers are even more preferable.

Examples of carbon fibers include polyacrylonitrile-based carbon fibers and pitch-based carbon fibers. In addition, a carbon fiber made from a plant-derived raw material, such as lignin or cellulose, can also be used.

The continuous reinforcing fibers used in the present invention may be treated with a treatment agent. Examples of the treatment agent include a surface treatment agent or a sizing agent.

A silane coupling agent is preferable as the surface treatment agent. Examples of the silane coupling agent include a silane coupling agent having a vinyl group, a silane coupling agent having an amino group, a silane coupling agent having an epoxy group, a silane coupling agent having a (meth)acrylic group, and a silane coupling agent having a mercapto group.

Examples of the sizing agent include urethane-based sizing agents, epoxy-based sizing agents, acrylic-based sizing agents, polyester-based sizing agents, vinyl ester-based sizing agents, polyolefin-based sizing agents, polyether-based sizing agents, and carboxylic acid-based sizing agents, and of these, a single sizing agent can be used, or two or more can be used in combination. Examples of combinations of two or more sizing agents include urethane/epoxy-based sizing agents, urethane/acrylic-based sizing agents, and urethane/carboxylic acid-based sizing agents.

Among these, from the viewpoints of improving the interfacial adhesiveness to the cured product of a thermosetting resin, and particularly of an epoxy resin composition, and further improving the strength and impact resistance of the obtained line, the continuous reinforcing fibers are preferably treated with one or more types of sizing agents selected from the group consisting of urethane-based sizing agents, epoxy-based sizing agents, and urethane/epoxy-based sizing agents, and are more preferably treated with an epoxy-based sizing agent.

From the viewpoints of improving the interfacial adhesiveness to a cured product of a thermosetting resin or a thermosetting resin composition and further improving the strength and impact resistance of the obtained liner, the amount of the treatment agent is preferably from 0.001 to 5 mass %, more preferably from 0.1 to 3 mass %, and even more preferably from 0.5 to 2 mass %, relative to the amount of the continuous reinforcing fibers.

Commercially available products can be also used as the continuous reinforcing fibers. Examples of commercially available products of carbon fibers that are continuous reinforcing fibers include Torayca (trade name) fibers of the series "T300", "T300B", "T400HB", "T700SC", "T800SC", "T800HB", "T830HB", "T1000 GB", "T100GC", "M35JB", "M40JB", "M46JB", "M50JB", "M55J", "M55JB", "M60JB", "M30SC", and "Z600", and Torayca Cloth (trade name) of the series "CO6142", "CO6151B", "CO6343", "CO6343B", "CO6347B", "CO6644B", "CK6244C", "CK6273C", and "CK6261C", the "UT70" series, the "UM46" series, and the "BT70" series, available from Toray Industries, Inc.

The content of the continuous reinforcing fibers in the liner of the present invention is not particularly limited, but from the viewpoint of obtaining a high strength and a high elastic modulus, the volume fraction (Vf) of continuous reinforcing fibers is preferably in a range of 10% or more, more preferably 20% or more, even more preferably 30% or more, and yet even more preferably 40% or more. In addition, from the viewpoints of gas barrier properties and impact resistance, the volume fraction is preferably in a range of 98% or less, more preferably 95% or less, even more preferably 80% or less, and yet even more preferably 70% or less.

The volume fraction (Vf) of the continuous reinforcing fibers in the liner can be calculated from the following equation.

Vf={(mass (g) of continuous reinforcing fibers in liner)/(specific gravity of continuous reinforcing fibers)}±{(mass (g) of liner)/(specific gravity of liner)}×100

The liner of the present invention is composed of a fiber-reinforced composite material, but can be provided with any layer such as a protective layer, a paint layer, or a rust-preventing layer.

However, from the viewpoint of obtaining the effects of the present invention, the total content of the continuous reinforcing fibers and cured product of the thermosetting resin or thermosetting resin composition in the liner of the present invention is preferably 70 mass % or more, more preferably 80 mass % or more, and even more preferably 90 mass % or more, and the upper limit is 100 mass %.

Method for Manufacturing Pressure Vessel Liner

The method for manufacturing the pressure vessel liner of the present invention (hereinafter, also referred to simply as the "manufacturing method of the present invention") is not particularly limited. Examples thereof include a method of molding through a braiding method, a winding method, a 3D printer method, or the like, using a prepreg constituted from the thermosetting resin or the thermosetting resin composition and the continuous reinforcing fibers.

From the viewpoint of molding a liner having the braided structure or spiral structure described above, the viewpoint of integrally molding the cylindrical portion of the liner with at least one dome portion, and the viewpoint of productivity, the method for manufacturing a pressure vessel liner of the present invention preferably includes a step of molding a tow prepreg constituted from a thermosetting resin or thermosetting resin composition and continuous reinforcing fibers, using the braiding method or winding method. From the viewpoint of being able to mold the liner without using a mandrel or the like, it is more preferable to use the braiding method.

The tow prepreg is obtained by impregnating a continuous reinforcing fiber bundle with the thermosetting resin or thermosetting resin composition. The epoxy resin composition described above is preferably used as the thermosetting resin or thermosetting resin composition, and from the viewpoint of enhancing impregnation into the continuous reinforcing fiber bundle, the composition more preferably contains a solvent.

The method of impregnating the thermosetting resin or thermosetting resin composition into the continuous reinforcing fibers is not particularly limited, and a known method can be used. Examples of such methods include a method of immersing, in a resin bath filled with a thermosetting resin or thermosetting resin composition, a continuous reinforcing fiber bundle unwound from a roll, impregnating the continuous reinforcing fiber bundle with the thermosetting resin or thermosetting resin composition, and then pulling the impregnated continuous reinforcing fiber bundle from the resin bath. Subsequently, a step of removing excess thermosetting resin or thermosetting resin composition using squeeze rollers or the like may be implemented.

Impregnation with the thermosetting resin or thermosetting resin composition can also be implemented under pressurized conditions or reduced pressure conditions, as necessary.

If the thermosetting resin composition contains a solvent, next, the continuous reinforcing fibers impregnated with the thermosetting resin composition are subjected to a drying step to remove the solvent. The drying conditions in the drying step are not particularly limited, but conditions in which the solvent can be removed and curing of the thermosetting resin in the composition does not proceed excessively are preferable. From this viewpoint, for example, a drying temperature in a range of from 30 to 100° C., and a drying time in a range of from 10 seconds to 5 minutes can be selected.

The drying step can be implemented by a known method using a hot air dryer, a heater, a heating roll, a hot plate, or the like. Examples of drying methods include a method of passing through a heating atmosphere using a hot air dryer, a heater, or the like, and a method of contacting with a heating body such as a heating roll or a hot plate. Among these, a method of using a hot air dryer is preferable.

The obtained tow prepreg may be wound temporarily on a bobbin, but from the viewpoint of productivity, supplying the tow prepreg continuously to a braiding method or winding method without winding on a bobbin is preferable.

Molding through the braiding method and the winding method using the tow prepreg can be implemented by a known method using a braider or winding device.

When the braiding method is used, for example, a mandrel such as one made of metal is used, the tow prepreg is braided by a braider so as to have a unidirectional or braided structure, and a prepreg having a cylindrical shape or a shape in which one or both ends of a cylindrical shape are sealed by a dome portion is molded. Next, a step is implemented in which the prepreg is heated to cure the thermosetting resin.

The heating is implemented by a known method at a temperature and time sufficient for curing the thermosetting resin contained in the prepreg. From the viewpoint of improving productivity, the heating temperature is preferably in a range from 80 to 140° C., and more preferably from 80 to 120° C., and the heating time is preferably in a range from 10 minutes to 5 hours.

Note that, in the braiding method, the tow prepreg can be braided without using a mandrel, and a prepreg having a cylindrical shape or a shape in which one or both ends of a cylindrical shape are sealed by a dome portion can be molded.

When the winding method is used, for example, a winding device is used, the tow prepreg is wound in a spiral shape onto an outer surface of a mandrel made of metal or the like, and a prepreg having a cylindrical shape or a shape in which one or both ends of a cylindrical shape are sealed by a dome portion is molded. Next, similar to above, the prepreg is heated to cure the thermosetting resin.

In a case in which a member is molded through the braiding method or the winding method with the member having only the cylindrical portion of the liner sealed or only one end of the cylindrical portion of the liner sealed, a separately produced dome portion can be joined and sealed to one or both ends of the cylindrical portion to thereby manufacture the liner of the present invention.

The liner of the present invention is a liner for a pressure vessel, and from the viewpoint of the effectiveness of the present invention, the pressure vessel is preferably a high-pressure gas storage tank. The gas to be stored in the high-pressure gas storage tank may be any material that is a gas at 25° C. and 1 atm, and examples thereof include hydrogen, oxygen, carbon dioxide, nitrogen, argon, LPG, alternative chlorofluorohydrocarbons, and methane. Among these, the gas is preferably hydrogen from the viewpoint of efficacy of the present invention.

High-Pressure Gas Storage Tank

A high-pressure gas storage tank of the present invention is provided with the pressure vessel liner described above. Providing the high-pressure gas storage tank of the present invention with the above-described pressure vessel liner yields excellent gas barrier properties such as a hydrogen gas barrier property, as well as a lightweight design, excellent pressure resistance and impact resistance.

The body section of the high-pressure gas storage tank of the present invention may be constituted from only the pressure vessel liner described above, or may be provided with the pressure vessel liner and an outer layer for reinforcing the liner. The liner of the present invention has excellent pressure resistance and impact resistance, and thus, even when an outer layer is provided, the thickness can be maintained at a thin level.

A high-pressure gas storage tank of the present invention including a liner and an outer layer is described below with reference to FIG. 5.

Figure 5:
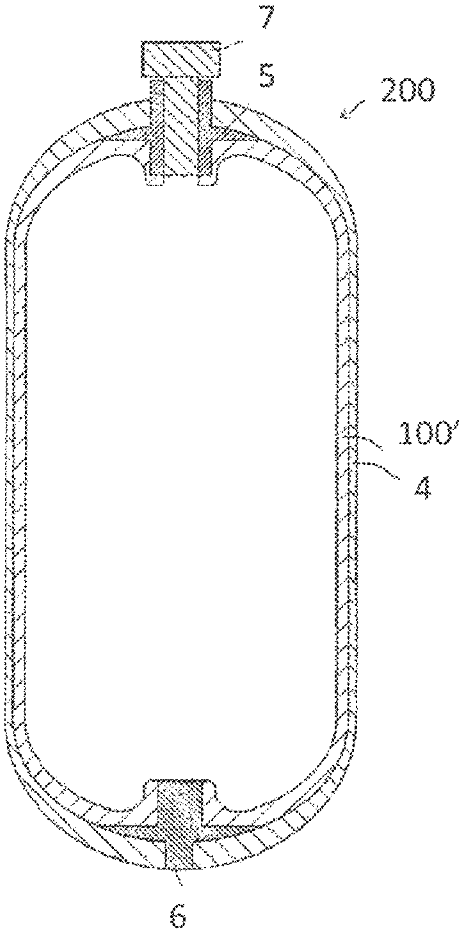
FIG. 5 is a cross-sectional schematic view illustrating an embodiment of a high-pressure gas storage tank of the present invention.

FIG. 5 is a cross-sectional schematic view illustrating an embodiment of a high-pressure gas storage tank of the present invention, and a high-pressure gas storage tank 200 includes a liner 100' and an outer layer 4. The outer layer 4 is formed to cover the outer surface of the liner 100' without a gap therebetween.

The outer layer 4 is not particularly limited as long as the outer layer 4 can reinforce the liner 100'.

From the viewpoints of impact resistance and gas barrier properties such as a hydrogen gas barrier property, the outer layer 4 is preferably constituted from a fiber-reinforced composite material. A material that is the same as the fiber-reinforced composite material constituting the liner 100' can be used as the fiber-reinforced composite material constituting the outer layer 4.

The thickness of the outer layer can be appropriately selected according to the capacity, shape, and the like of the high-pressure gas storage tank, but from the viewpoint of imparting impact resistance and high gas barrier properties, the thickness of the outer layer is preferably 100 μm or more, more preferably 200 μm or more, and even more preferably 400 μm or more, and from the viewpoint of reducing the size and weight of the high-pressure gas storage tank, the thickness of the outer layer is preferably 80 mm or less, and more preferably 60 mm or less.

The outer layer 4 may be provided directly on the outer surface of the liner 100'. Alternatively, one or more other layers may be provided on the outer surface of the liner, and the outer layer 2 may be provided on the surface of the other layers. For example, to improve adhesiveness between the liner and the outer layer, an adhesive layer may be provided between the liner and the outer layer.

In addition, any optional layer such as a protective layer, a paint layer, or a rust-preventing layer may be formed on the surface of the outer layer 4.

A mouthpiece 5 has, for example, a substantially cylindrical shape, and is fitted and fixed between the liner 100' and the outer layer 4. A substantially cylindrically-shaped opening of the mouthpiece 5 functions as an opening of the high-pressure gas storage tank 200. The mouthpiece 5 may be formed from another metal such as stainless steel or aluminum, or may be made of resin.

A boss 6 is, for example, made from aluminum, is assembled with a portion thereof being exposed externally, and serves to guide heat from heat generation and heat absorption within the tank to the outside.

A valve 7 has, for example, a shape in which male threads are formed in a cylindrical portion, and is screwed together with female threads formed in an inner surface of the mouthpiece 5, and thereby the opening of the mouthpiece 5 is closed by the valve 7. Note that in the high-pressure gas storage tank of the present invention, the mouthpiece 5, the boss 6, and the valve 7 can be replaced by other means.

Note that a high-pressure gas storage tank configured by only the liner of the present invention can be configured in the same manner as the high-pressure gas storage tank illustrated in FIG. 5, with the exception that the provision of the outer layer 4 is excluded. Alternatively, the mouthpiece 5 and the valve 7 can be attached to the opening 3 of the liner 100 illustrated in FIGS. 1 and 2, and the resulting product can be used as a high-pressure gas storage tank.

EXAMPLES

Next, the present invention will be described specifically with reference to examples. However, the present invention is not limited in any way by these examples.

Measurements and evaluations in the present examples were performed by the following methods.

<Hydrogen Gas Permeability Coefficient [$cc^3$·cm/($cm^2$·s·cmHg)]>

A bar coater was used to apply an epoxy resin composition prepared in each production example onto a smooth metal plate coated with a mold release agent. The epoxy resin composition was applied in a 200 mm square at a thickness of 100 μm and then heated and cured at 100° C. for 5 minutes to produce a cured product. The hydrogen gas permeability coefficient of this cured product was measured in a dried state at 23° C. using the cured product and a water vapor permeability measuring device ("G2700 T·F", available from GTR Tec Corporation).

Glass Transition Temperature

The glass transition temperature Tg of the cured product of the epoxy resin composition used in the liner manufactured in each of the examples was measured using a differential scanning calorimeter device ("DSC 25" available from TA Instruments).

Under a nitrogen stream, approximately 5 mg of a sample (epoxy resin composition) was subjected to a thermal history under the following conditions. The thermal history conditions included a first temperature increase (at a temperature increase rate of 10° C./min), followed by cooling (at a temperature decrease rate of 10° C./min), and then a second temperature increase (at a temperature increase rate 10° C./min). The heating temperature was from room temperature to 225° C., and the peak temperature of the glass transition temperature observed in the second temperature increase was read and is indicated in Table 1.

Tensile Strength

A 1A-type test piece as defined in JIS K7161-2:2014 was produced using a plate material made of the same fiber-reinforced composite material constituting the liner manufactured in each of the examples, and the resulting test piece was used in the measurements. A tensile test at a temperature of 23° C., a distance between grips of 50 mm, and a test speed of 1 mm/min was implemented in accordance with JIS K7161-1:2014 and JIS K7161-2:2014 using a tensile tester ("AGX-100kNplus" available from Shimadzu Corporation), and the tensile strength was measured.

Production Example 1

Preparation of Epoxy Resin Curing Agent Solution A

A reaction vessel was charged with 1 mol of meta-xylylenediamine (MXDA). The temperature was raised to 60° C. under a nitrogen stream, and 0.93 mol of methyl acrylate was added dropwise over 1 hour. The temperature was increased to 165° C. while generated methanol was distilled off, and the temperature was then maintained at 165° C. for 2.5 hours, and thereby an epoxy resin curing agent was obtained as a reaction product between the MXDA and the methyl acrylate. Methanol was then added dropwise to the epoxy resin curing agent over 1.5 hours, and an epoxy resin curing agent solution A containing 65 mass % of the epoxy resin curing agent and 35 mass % of methanol was obtained.

Preparation of Epoxy Resin Composition 1

To 14.4 g of the obtained epoxy resin curing agent solution A, 1.5 g of methanol and 9.9 g of ethyl acetate as solvents, and, as an epoxy resin, 4.5 g of an epoxy resin ("TETRAD-X", available from Mitsubishi Gas Chemical Co., Inc.) having a glycidylamino group derived from meta-xylylenediamine [(number of active amine hydrogens in the epoxy resin curing agent)/(number of epoxy groups in the epoxy resin)=1.2] were added and stirred, and an epoxy resin composition 1 having a solid content concentration of 40 mass % was prepared.

The hydrogen gas permeability coefficient of a cured product of the epoxy resin composition 1 was measured by the method described above and was $3.9\times10^{-11}$ [$cc^3\cdot cm/(cm^2\cdot s\cdot cmHg)$].

Example 1: Production of Pressure Vessel Liner and High-Pressure Gas Storage Tank A pressure vessel liner and a high-pressure gas storage tank were produced in the following manner.

Production of Pressure Vessel Liner

The epoxy resin composition 1 obtained in Production Example 1 was used as a thermosetting resin composition, and "Torayca T800SC-24000" continuous carbon fibers (number of filaments: 24000, fiber fineness: 1030 tex, tensile modulus: 294 GPa) available from Toray Industries, Inc. were used as continuous reinforcing fibers.

The epoxy resin composition 1 was impregnated into the continuous carbon fibers, after which the obtained product was dried by heating for 80 seconds in a hot air dryer at 80° C., and a tow prepreg was produced. Next, the tow prepreg was braided through the braiding method on a metal mandrel having a diameter of 250 mm and a length of 1200 mm such that the tow prepreg had a braided structure as illustrated in FIG. 3, and a cylindrical prepreg having an outer diameter of 300 mm, a length of 1000 mm, and a thickness of 25 mm was produced. This cylindrical prepreg was heated and cured at 120° C. for 30 minutes on the metal mandrel, after which the metal mandrel was removed, and a liner cylindrical portion 1 constituted from a carbon fiber reinforced composite material was produced as illustrated in FIGS. 1 and 2. The volume fraction (Vf) of the continuous carbon fibers in the liner cylindrical portion 1 was 55%.

Production of Dome Portion of Liner

The epoxy resin composition 1 obtained in Production Example 1 was used as the thermosetting resin composition, and the "Torayca Cloth UT70-30G" (unidirectional cloth, sheet thickness of 0.167 mm) continuous carbon fibers available from Toray Industries, Inc. were used as the continuous reinforcing fibers.

The epoxy resin composition 1 was impregnated into the continuous carbon fibers, after which the obtained product was dried by heating for 80 seconds in a hot air dryer at 80° C., and a prepreg was produced. Next, a mold was used to produce a hollow dome portion 21 and a hollow dome portion 22 having the shapes illustrated in FIGS. 1 and 2 through a hot press molding method at a pressing pressure of 0.5 MPa, a pressing temperature of 140° C., and a pressing time of 120 minutes, with the hollow dome portion 21 having an opening with a diameter of 50 mm and the hollow dome 22 not having an opening. The dome portions 21 and 22 each had an outer diameter of 300 mm, a dome portion height of 125 mm, and a thickness of 25 mm, and the volume fraction (Vf) of continuous carbon fibers was 55%.

Production of Liner and High-Pressure Gas Storage Tank

The liner 100 illustrated in FIGS. 1 and 2 was obtained by joining the dome portions 21 and 22 to both ends of the liner cylindrical portion 1 obtained by the method described above. Furthermore, the same tow prepreg as that used in the production of the cylindrical portion of the liner was wound onto the outer surface of the liner 100 through a filament winding method, and then heated at 120° C. for 240 minutes to form an outer layer having a thickness of 60 mm, and a high-pressure gas storage tank was obtained.

Example 2: Production of Pressure Vessel Liner and High-Pressure Gas Storage Tank A tow prepreg was produced by the same method as in Example 1. Next, the tow prepreg was braided through the braiding method on a metal mandrel having a diameter of 250 mm and a length of 1200 mm such that the tow prepreg had a braided structure as illustrated in FIG. 3, and a prepreg having a shape in which one end of the cylindrical portion was sealed by a hollow dome portion was produced. The prepreg cylindrical portion had an outer diameter of 300 mm, a length of 1000 mm. and a thickness of 25 mm, and the dome portion of the prepreg had an outer diameter of 300 mm, a dome portion height of 125 mm, and a thickness of 25 mm. The prepreg was heated and cured at 120° C. for 30 minutes on the metal mandrel, after which the metal mandrel was removed, and a member in which one end of the liner cylindrical portion 1 was sealed by the dome portion 22 was produced. The volume fraction (Vf) of the continuous carbon fibers in the member was 55%.

Next, a hollow dome portion 21 having an outer diameter of 300 mm, a dome portion height of 125 mm, and a height of 25 mm and having an opening with a diameter of 50 mm was produced in the same manner as in Example 1. The dome portion 21 was then joined to the member described above using bolts, and the liner 100 was obtained. Furthermore, an outer layer was formed on the outer surface of the liner 100 in the same manner as in Example 1, and a high-pressure gas storage tank was obtained.

Also, with regard to the epoxy resin cured product and the fiber-reinforced composite material constituting the liner cylindrical portions obtained in Example 1 and Example 2, the glass transition temperature of the epoxy resin cured product and the tensile strength of the fiber-reinforced composite material were measured by the methods described above, and the results are shown in Table 1.

Note that a polyethylene resin ("UF420", available from Japan Polyethylene Corporation), which is a thermoplastic resin, was used in place of the fiber-reinforced composite material used in Examples 1 and 2, and the glass transition temperature and tensile strength of the polyethylene resin was measured by the methods described above, and those measurement results are also shown (as Reference Example 1) in Table 1.

TABLE 1

| | Example 1 | Example 2 | Reference Example 1 |
|---|---|---|---|
| Glass transition temperature (° C.) | 65 | 65 | −125 |
| Tensile strength (MPa) | 850 | 850 | 30 |

According to the present invention, a pressure vessel liner that is lightweight, has gas barrier properties such as a hydrogen gas barrier property, and also thermal resistance and high strength, and enables excellent productivity can be provided.

The gas barrier properties, heat resistance, and strength of the pressure vessel liner according to the present invention are high, and therefore the resulting pressure vessel can be used as is as a pressure vessel for a high-pressure gas storage tank without providing an outer layer. A high-pressure gas storage tank provided with the pressure vessel liner is suitable as a vehicle-mounted high-pressure gas storage tank, and because the high-pressure gas storage tank is lightweight, the tank can improve the fuel economy of the vehicle on which it is mounted.

REFERENCE SIGNS LIST

100, 100' Liner for pressure vessel
1 Cylindrical portion
1*a*, 1*b* End part of cylindrical portion
21, 22 Dome portion
3 Opening
10 Fiber-reinforced composite material
11 Cured product of tow prepreg
200 High-pressure gas storage tank
4 Outer Layer
5 Mouthpiece
6 Boss
7 Valve

The invention claimed is:

1. A liner for a pressure vessel, being constituted from a fiber- reinforced composite material, the fiber-reinforced composite material comprising: a cured product of a thermosetting resin composition; and continuous reinforcing fibers, and wherein the thermosetting resin composition is an epoxy resin composition comprising an epoxy resin (A) and an epoxy resin curing agent (B), the epoxy resin curing agent (B) comprising a reaction product of: a component (x1); and a component (x2) described below:

(x1) at least one selected from the group consisting of meta-xylylenediamine and para-xylylenediamine, and (x2) at least one selected from the group consisting of unsaturated carboxylic acids represented by General Formula (1) below and derivatives thereof;

(1)

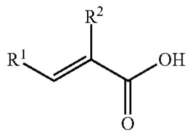

where in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

2. The liner for a pressure vessel according to claim 1, wherein the fiber-reinforced composite material constituting the liner has a braided structure or a spiral structure.

3. The liner for a pressure vessel according to claim 1, having a cylindrical portion and two dome portions configured to seal both ends of the cylindrical portion.

4. The liner for a pressure vessel according to claim 3, wherein the cylindrical portion and at least one of the dome portions are integrally molded.

5. The liner for a pressure vessel according to claim 1, wherein the epoxy resin (A) comprises, as a main component, an epoxy resin having a glycidylamino group derived from meta-xylylenediamine.

6. The liner for a pressure vessel according to claim 1, wherein the continuous reinforcing fibers are at least one selected from the group consisting of glass fibers, carbon fibers, and basalt fibers.

7. A high-pressure gas storage tank comprising the liner for a pressure vessel described in claim 1.

* * * * *